2 Sheets—Sheet 1.
A. BATAILLE.
Flexible-Joint for Pipes.
No. 225,267. Patented Mar. 9, 1880.
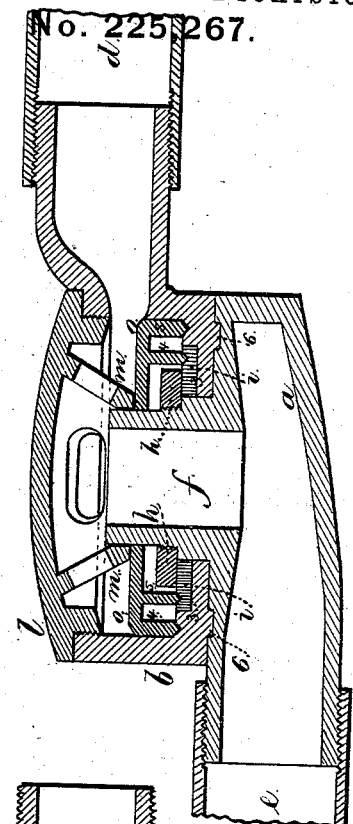
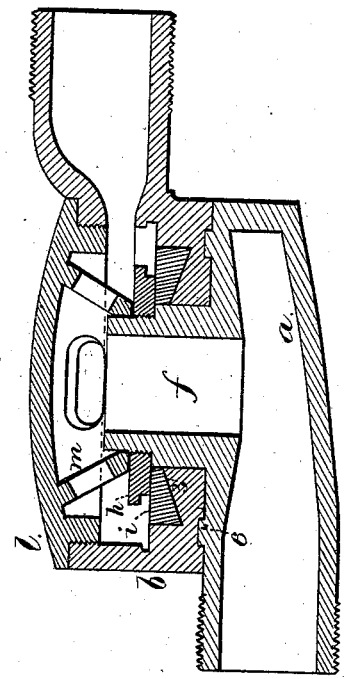
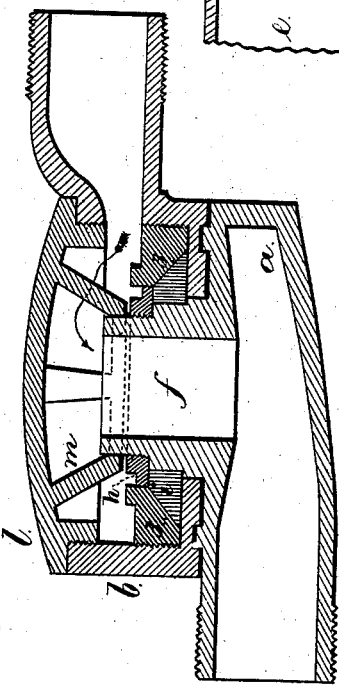
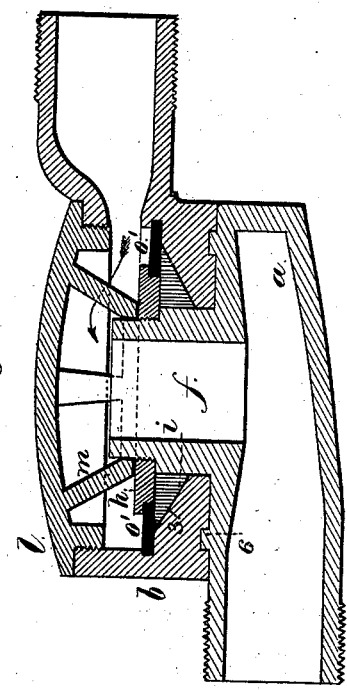
Witnesses
Harold Serrell
Chas H. Smith
Inventor
Achille Bataille
per Lemuel W. Serrell
Atty 2 Sheets—Sheet 2.
A. BATAILLE.
Flexible-Joint for Pipes.
No. 225,267. Patented Mar. 9, 1880.
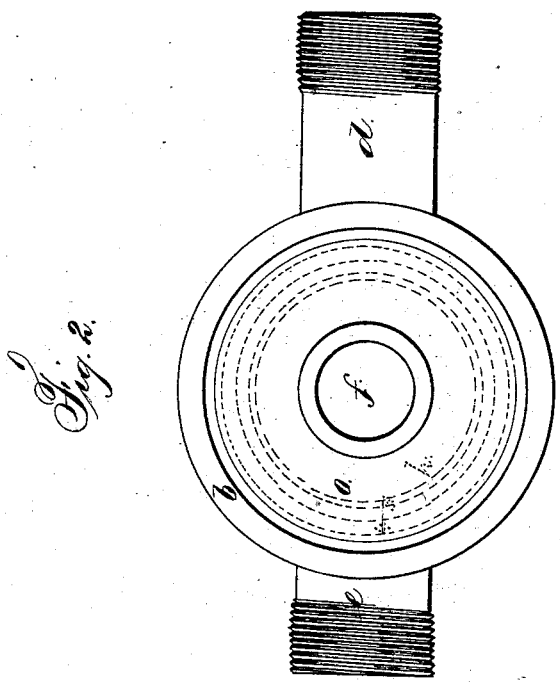
Witnesses
Harold Serrell
Chas H Smith
Inventor
Achille Bataille
per Lemuel W. Serrell
atty

UNITED STATES PATENT OFFICE.

ACHILLE BATAILLE, OF NEW YORK, N. Y.

FLEXIBLE JOINT FOR PIPES.

SPECIFICATION forming part of Letters Patent No. 225,267, dated March 9, 1880.

Application filed July 10, 1879.

*To all whom it may concern:*

Be it known that I, ACHILLE BATAILLE, of the city and State of New York, have invented an Improvement in Flexible Joints for Pipes, of which the following is a specification.

Pipe-couplings have been made so as to be kept tight by the internal pressure acting upon a packing, and in some instances the pipe can be revolved at the coupling, and in other instances the angle of one part of the pipe to the other can be varied.

My flexible joint is made with reference to allowing the angle between the two pipes to be varied, and so that the pressure will keep the joint tight. Thereby the joint can be easily used with air-brakes upon railway-cars, or under any other circumstances where the joint is required to yield freely in one direction, and the pressure will render the joint tight even when it moves freely or is loose when there is no pressure.

I make use of a ring-nut within the coupling, to connect the two shells, and there is a tubular bearing to keep the shells in the proper relative positions and an annular bearing against which the pressure acts to keep the parts of the flexible joint steam or air tight when in use.

In the drawings, Figure 1 is a section of the flexible joint, and Fig. 2 is a plan of the same with the cap removed. The other figures represent modifications of the devices, and are separately referred to.

The coupling-shells $a$ and $b$ are of suitable size, and to these the pipes $d$ and $e$ are permanently connected by any suitable device, such as a screw. The tubular thimble $f$ projects from one side of the case $a$, and the case $b$ sets over this thimble, and the nut $h$ prevents the parts becoming separated, but allows the shell $b$ to turn freely upon the thimble $f$ and shell $a$.

There is a cap, $l$, to the shell $b$, and this is removed when the nut $h$ is screwed upon the thimble $f$. Upon the inside of the cap $l$ is an inward-projecting tubular bearing, $m$, that surrounds the inner end of the thimble $f$, so as to cause the two shells to turn true, the one on the other, and prevent the parts becoming displaced in use, and this bearing $m$ has openings or is formed of open-work, so as not to intercept the free flow of the liquid through the pipes.

There is a ring, $i$, around the thimble $f$, which ring performs the duty of an annular bearing. It is held in place by the nut $h$, and this annular bearing $i$ is made to fit tightly around said thimble $f$, so as to be air or fluid tight at the joint between the ring $i$ and thimble $f$ when the nut $h$ is screwed tightly upon the same.

The portion of the case $b$ which is between the bearing-ring $i$ and the case $a$ is free to turn, but it bears against the surface of the bearing-ring, and it is necessary that the surface of the bearing-ring be ground or made to fit steam-tight at its bearing upon the part 3 of the case $b$.

The bearing-surface of the bearing-ring $i$ may be flat, curved, or conical. This surface is shown as conical in the sections, Figs. 3, 4, and 5; but in Fig. 3 the inclination of the conical surface is the reverse to what it is in Fig. 5, the bearing-ring being thickest at its outer edge. The curved surface may be used in place of either of the conical surfaces. In Fig. 1 the bearing-ring $i$ is of the same thickness throughout, both faces being flat.

It is to be understood that when the fluid or liquid under pressure acts within the shells $a$ and $b$ the tendency is to separate them and bring the surface 3 forcibly into contact with the bearing-ring, and make a tight joint at this place. If, on the contrary, there is a vacuum action in the pipes the atmospheric pressure will force the shells toward each other, and the bearing-ring requires to be placed the other side up, as shown in Fig. 4, and the bearing portion 3 of the case $b$ has to be a separate ring, screwed into the shell $b$.

In some instances I make use of the secondary bearing-ring, $o$, (shown in Fig. 1,) the same having annular ribs 4 and 5, which bear into grooves that are turned in the back surface of the bearing-ring $i$ and shell $b$, near the edge of said ring $i$. In this instance the internal pressure forces the annular ribs upon the surfaces as well as keeping the surface 3 tightly against the annular bearing $i$.

The surfaces of the shells $a$ and $b$ that are in contact may be provided with annular ribs and grooves, as at 6, to take any lateral strain off the thimble $f$.

The ring, of india-rubber or similar material, introduced at $o$, Fig. 2, serves to prevent dust passing into the joint.

I claim as my invention—

1. The shells $a$ and $b$, in combination with the thimble $f$ on the shell $a$, the nut $h$, the bearing-ring $i$, cap $l$, and bearing 3, substantially as set forth.

2. The combination of the shells $a$ $b$, thimble $f$, bearing-ring $i$, nut $h$, cap $l$, bearing 3, and auxiliary bearing-ring $o$, substantially as set forth.

Signed by me this 3d day of July, A. D. 1879.

ACHILLE BATAILLE.

Witnesses:
 HAROLD SERRELL,
 GEO. T. PINCKNEY.